United States Patent [19]

New

[11] Patent Number: 6,106,712
[45] Date of Patent: Aug. 22, 2000

[54] VEHICLE LIQUID WASTE COLLECTION SYSTEM

[76] Inventor: Gerald R. New, 30925 SE. Judd Rd., Eagle Creek, Oreg. 97022

[21] Appl. No.: 09/443,978

[22] Filed: Nov. 19, 1999

[51] Int. Cl.$^7$ .............................. C02F 1/40; B01D 21/00; B01D 17/032
[52] U.S. Cl. ...................... 210/241; 210/513; 210/532.1; 210/538; 210/540; 210/541; 210/251; 184/1.5; 184/106; 184/6.24; 141/98
[58] Field of Search ..................................... 210/241, 513, 210/532.1, 538, 540, 541, 251; 184/1.5, 106, 6.24; 141/98

[56] References Cited

U.S. PATENT DOCUMENTS

| | | |
|---|---|---|
| 4,114,644 | 9/1978 | Piper . |
| 4,246,982 | 1/1981 | Pretnick . |
| 4,315,561 | 2/1982 | Partridge . |
| 4,392,552 | 7/1983 | Partridge . |
| 4,877,261 | 10/1989 | Heisson . |
| 5,033,489 | 7/1991 | Ferre et al. . |
| 5,190,085 | 3/1993 | Dietzen . |
| 5,462,655 | 10/1995 | Ladd et al. . |
| 5,478,625 | 12/1995 | Wright . |
| 5,482,181 | 1/1996 | Weaver . |
| 5,503,246 | 4/1996 | Raboin et al. . |
| 5,738,139 | 4/1998 | DeChard . |
| 6,022,473 | 2/2000 | Mickelson . |

Primary Examiner—Thomas M. Lithgow

[57] ABSTRACT

A vehicle liquid waste collection system for collecting fluids from a vehicle and separating non-water soluble materials from water soluble materials. The vehicle liquid waste collection system includes a support member having an upper surface. A ramp assembly extending from the support member. A containment wall extending upwardly from the upper surface. The support member includes an aperture in the upper surface such that the upper surface is angled downwards towards the aperture. A collection member having a hollow interior. The hollow interior has a first chamber and a second chamber in environmental communication. A duct in environmental communication between the aperture and the first chamber of the collection member. The duct is elevated relative to the first chamber whereby liquid waste collected passes through the duct and into the first chamber. Non-water soluble contaminants in the liquid waste having a lower density than water are positioned above an upper surface of water collected in the first chamber while water soluble liquid is stored in the second chamber.

9 Claims, 2 Drawing Sheets

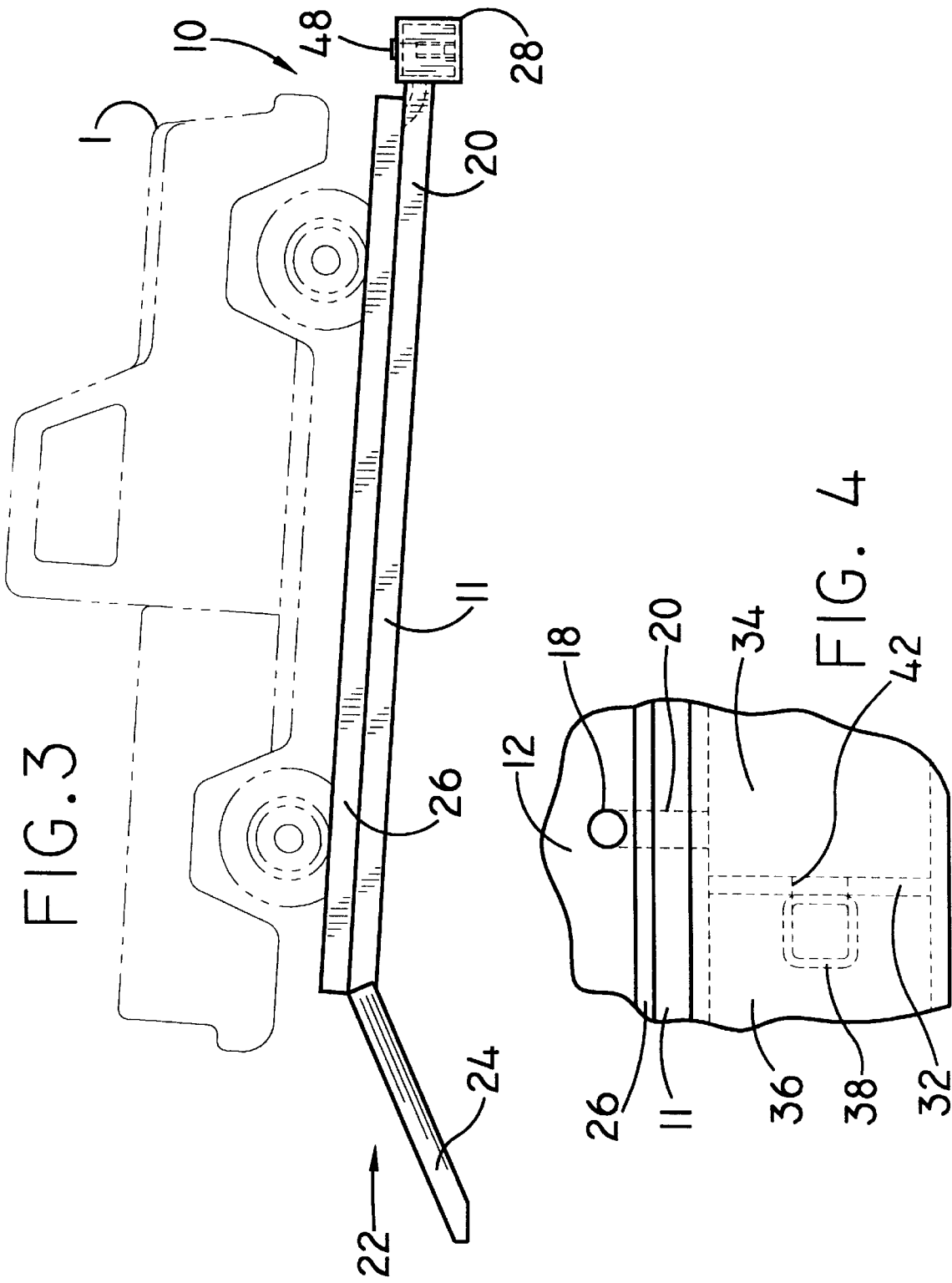

VEHICLE LIQUID WASTE COLLECTION SYSTEM

BACKGROUND OF THE INVENTION

1. Field of the Invention

The present invention relates to oil and water separators and more particularly pertains to a new vehicle liquid waste collection system for collecting fluids from a vehicle and separating non-water soluble materials from water soluble materials.

2. Description of the Prior Art

The use of oil and water separators is known in the prior art. More specifically, oil and water separators heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,419,145; U.S. Pat. No. 5,190,085; U.S. Pat. No. 4,122,009; U.S. Pat. No. 4,301,841; U.S. Pat. No. 5,520,825; and U.S. Pat. No. 4,010,863.

While these devices fulfill their respective, particular objectives and requirements, the aforementioned patents do not disclose a new vehicle liquid waste collection system. The inventive device includes a support member having an upper surface and opposite first and second ends. The upper surface is for supporting a vehicle when the vehicle is positioned on the upper surface. A ramp assembly extends from the first end of the support member for facilitating positioning the vehicle on the upper surface of the support member. The ramp assembly further being for elevating the first end of the support member relative to the second end of the support member. A containment wall extends upwardly from the upper surface for collecting liquid waste falling from the vehicle when the vehicle is positioned on the upper surface of the support member. The support member includes an aperture in the upper surface proximate the second end and a duct has a first end in environmental communication with the aperture whereby gravity urges the liquid waste collected through the aperture into the duct. A collection member has a hollow interior. The collection member includes a dividing wall separating the hollow interior into a first chamber and a second chamber. The duct has a second end in environmental communication with the first chamber. The first end of the duct is elevated relative to the second end of the duct whereby liquid waste collected passes through the duct and into the first chamber such that the liquid waste is collected in the first chamber. Non-water soluble contaminants in the liquid waste having a lower density than water are positioned above an upper surface of water collected in the first chamber. A tube has a lower end in communication with the first chamber through a hole in the dividing wall. The tube has an open upper end located at a higher vertical elevation than an upper edge of the hole in the dividing wall. The upper end of the tube is in environmental communication with the second chamber whereby non-water soluble contaminants positioned above the upper surface of water collected in the first chamber are retained in the first chamber as liquid is drawn through the tube into the second chamber when the upper surface of water collected in the first chamber is at a higher elevation than the upper edge of the hole in the dividing wall.

In these respects, the vehicle liquid waste collection system according to the present invention substantially departs from the conventional concepts and designs of the prior art, and in so doing provides an apparatus primarily developed for the purpose of collecting fluids from a vehicle and separating non-water soluble materials from water soluble materials.

SUMMARY OF THE INVENTION

In view of the foregoing disadvantages inherent in the known types of oil and water separators now present in the prior art, the present invention provides a new vehicle liquid waste collection system construction wherein the same can be utilized for collecting fluids from a vehicle and separating non-water soluble materials from water soluble materials.

The general purpose of the present invention, which will be described subsequently in greater detail, is to provide a new vehicle liquid waste collection system apparatus and method which has many of the advantages of the oil and water separators mentioned heretofore and many novel features that result in a new vehicle liquid waste collection system which is not anticipated, rendered obvious, suggested, or even implied by any of the prior art oil and water separators, either alone or in any combination thereof.

To attain this, the present invention generally comprises a support member having an upper surface and opposite first and second ends. The upper surface is for supporting a vehicle when the vehicle is positioned on the upper surface. A ramp assembly extends from the first end of the support member for facilitating positioning the vehicle on the upper surface of the support member. The ramp assembly further being for elevating the first end of the support member relative to the second end of the support member. A containment wall extends upwardly from the upper surface for collecting liquid waste falling from the vehicle when the vehicle is positioned on the upper surface of the support member. The support member includes an aperture in the upper surface proximate the second end and a duct has a first end in environmental communication with the aperture whereby gravity urges the liquid waste collected through the aperture into the duct. A collection member has a hollow interior. The collection member includes a dividing wall separating the hollow interior into a first chamber and a second chamber. The duct has a second end in environmental communication with the first chamber. The first end of the duct is elevated relative to the second end of the duct whereby liquid waste collected passes through the duct and into the first chamber such that the liquid waste is collected in the first chamber. Non-water soluble contaminants in the liquid waste having a lower density than water are positioned above an upper surface of water collected in the first chamber. A tube has a lower end in communication with the first chamber through a hole in the dividing wall. The tube has an open upper end located at a higher vertical elevation than an upper edge of the hole in the dividing wall. The upper end of the tube is in environmental communication with the second chamber whereby non-water soluble contaminants positioned above the upper surface of water collected in the first chamber are retained in the first chamber as liquid is drawn through the tube into the second chamber when the upper surface of water collected in the first chamber is at a higher elevation than the upper edge of the hole in the dividing wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle liquid waste collection system apparatus and method which has many of the advantages of the oil and water separators mentioned heretofore and many novel features that result in a new vehicle liquid waste collection system which is not anticipated, rendered obvious, suggested, or even implied by any of the prior art oil and water separators, either alone or in any combination thereof.

It is another object of the present invention to provide a new vehicle liquid waste collection system which may be easily and efficiently manufactured and marketed.

It is a further object of the present invention to provide a new vehicle liquid waste collection system which is of a durable and reliable construction.

An even further object of the present invention is to provide a new vehicle liquid waste collection system which is susceptible of a low cost of manufacture with regard to both materials and labor, and which accordingly is then susceptible of low prices of sale to the consuming public, thereby making such vehicle liquid waste collection system economically available to the buying public.

Still yet another object of the present invention is to provide a new vehicle liquid waste collection system which provides in the apparatuses and methods of the prior art some of the advantages thereof, while simultaneously overcoming some of the disadvantages normally associated therewith.

Still another object of the present invention is to provide a new vehicle liquid waste collection system for collecting fluids from a vehicle and separating non-water soluble materials from water soluble materials.

Yet another object of the present invention is to provide a new vehicle liquid waste collection system which includes a support member having an upper surface and opposite first and second ends. The upper surface is for supporting a vehicle when the vehicle is positioned on the upper surface. A ramp assembly extends from the first end of the support member for facilitating positioning the vehicle on the upper surface of the support member. The ramp assembly further being for elevating the first end of the support member relative to the second end of the support member. A containment wall extends upwardly from the upper surface for collecting liquid waste falling from the vehicle when the vehicle is positioned on the upper surface of the support member. The support member includes an aperture in the upper surface proximate the second end and a duct has a first end in environmental communication with the aperture whereby gravity urges the liquid waste collected through the aperture into the duct. A collection member has a hollow interior. The collection member includes a dividing wall separating the hollow interior into a first chamber and a second chamber. The duct has a second end in environmental communication with the first chamber. The first end of the duct is elevated relative to the second end of the duct whereby liquid waste collected passes through the duct and into the first chamber such that the liquid waste is collected in the first chamber. Non-water soluble contaminants in the liquid waste having a lower density than water are positioned above an upper surface of water collected in the first chamber. A tube has a lower end in communication with the first chamber through a hole in the dividing wall. The tube has an open upper end located at a higher vertical elevation than an upper edge of the hole in the dividing wall. The upper end of the tube is in environmental communication with the second chamber whereby non-water soluble contaminants positioned above the upper surface of water collected in the first chamber are retained in the first chamber as liquid is drawn through the tube into the second chamber when the upper surface of water collected in the first chamber is at a higher elevation than the upper edge of the hole in the dividing wall.

Still yet another object of the present invention is to provide a new vehicle liquid waste collection system that prevents fluids being discarded from a vehicle from coming into contact and destroying concrete or contaminating soil.

Even still another object of the present invention is to provide a new vehicle liquid waste collection system that contains and separates the fluids from the vehicle for easy disposal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevational view of the present invention in use.

FIG. 4 is a cross-sectional view of the present invention taken along line 4—4 of FIG. 2.

DESCRIPTION OF THE PREFERRED EMBODIMENT

Figure 1:
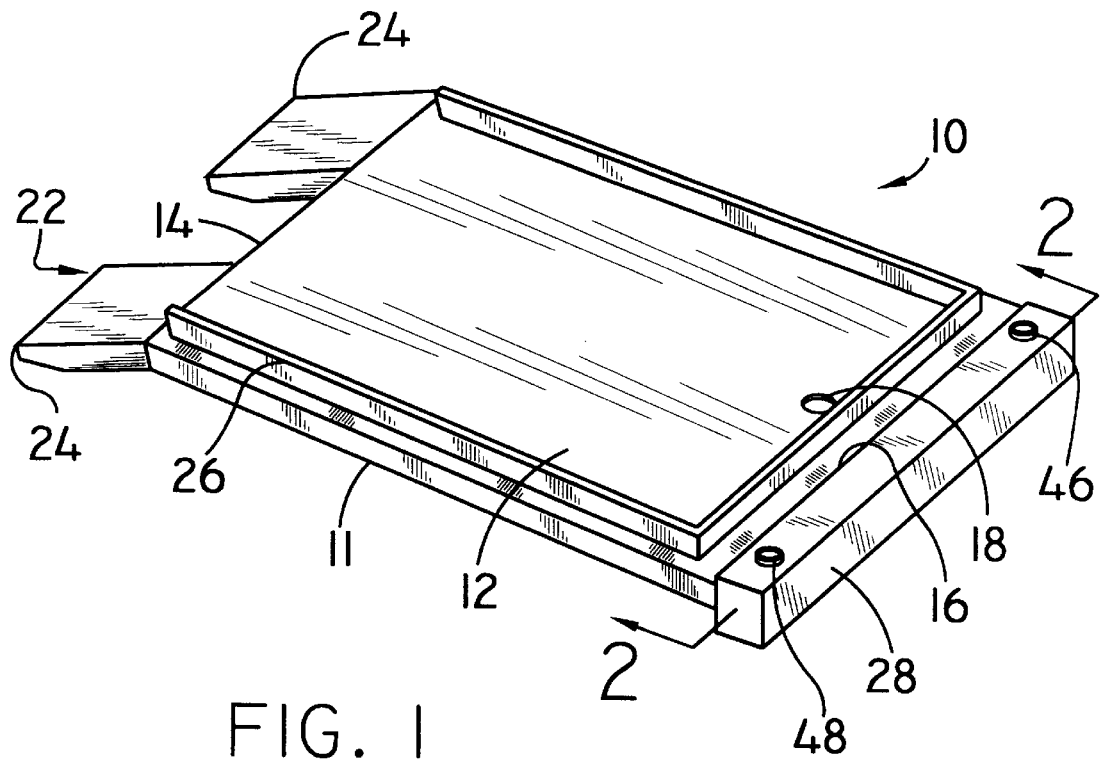
FIG. 1 is a perspective view of a new vehicle liquid waste collection system according to the present invention.

With reference now to the drawings, and in particular to FIGS. 1 through 4 thereof, a new vehicle liquid waste collection system embodying the principles and concepts of the present invention and generally designated by the reference numeral 10 will be described.

As best illustrated in FIGS. 1 through 4, the vehicle liquid waste collection system 10 generally comprises a support member 11 having an upper surface 12 and opposite first 14 and second ends 16. The tipper surface is for supporting a vehicle 1 when the vehicle is positioned on the upper surface. The support member includes an aperture 18 in the upper surface proximate the second end and a duct 20 having a first end in environmental communication with the aperture whereby gravity urges the liquid waste collected through the aperture into the duct. In an embodiment the support member would have a height of approximately one foot, a length of approximately twenty feet and a width of approximately eight feet.

As shown in FIGS. 1 and 3, a ramp assembly 22 extends from the first end of the support member for facilitating positioning the vehicle on the upper surface of the support member. The ramp assembly further being for elevating the first end of the support member relative to the second end of the support member.

The ramp assembly includes a pair of ramp members 24. Each ramp member extends outwardly from a respective side portion of the first end of the support member such that the ramp members are spaced to facilitate driving of the vehicle over the ramp members. Each of the ramp members has a planar upper surface. A planar bottom surface. The planar upper surface is substantially parallel to the planar bottom surface. Each ramp member further has a support surface extending from the bottom surface such that the support surface is adapted for abutting the ground.

A containment wall 26 extending upwardly from the upper surface for collecting liquid waste falling from the vehicle when the vehicle is positioned on the upper surface of the support member. The containment wall is generally U-shaped. The containment wall has opposite sides, wherein each side extends along an associated longitudinal side of the support member.

Figure 2:
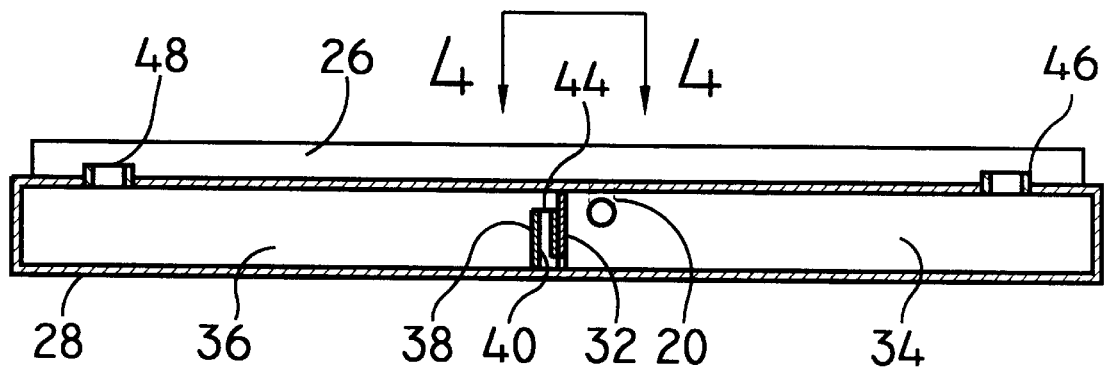
FIG. 2 is a cross-sectional view of the present invention taken along line 2—2 of FIG. 1.

As shown in FIGS. 2 and 4, a collection member 28 has a hollow interior 30. The collection member includes a dividing wall 32 separating the hollow interior into a first chamber 34 and a second chamber 36. The duct has a second end in environmental communication with the first chamber. The first end of the duct is elevated relative to the second end of the duct whereby liquid waste collected passes through the duct and into the first chamber such that the liquid waste is collected in the first chamber. Non-water soluble contaminants in the liquid waste having a lower density than water are positioned above an upper surface of water collected in the first chamber. The collection member is coupled to the second end of the support member. In an embodiment the collection member has a length approximately eight feet long to correspond to the width of the support member.

A tube 38 has a lower end 40 in communication with the first chamber through a hole 42 in the dividing wall. The tube has an open upper end 44 located at a higher vertical elevation than an upper edge of the hole in the dividing wall. The upper end of the tube is in environmental communication with the second chamber whereby non-water soluble contaminants positioned above the upper surface of water collected in the first chamber are retained in the first chamber as liquid is drawn through the tube into the second chamber when the upper surface of water collected in the first chamber is at a higher elevation than the upper edge of the hole in the dividing wall. The first chamber has a first chamber pumping access port 46 for facilitating pumping of liquid waste collected in the first chamber. The second chamber has a first chamber pumping access port 48 for facilitating pumping of water collected in the second chamber. The tube has a cross-sectional area greater than a cross-sectional area of the duct.

In use, a user would put the support member down in a substantially level area and the ramp members would be positioned such that the user can easily facilitate the vehicle up the ramp members and onto the support member. As fluids drip from the vehicle they collect on the upper surface of the support member and the containment walls. The upper surface of the support member is at an angle such that the fluids will drain down from to the upper surface to the aperture through the upper surface. The fluids then drain through the duct into the first chamber of the collection member. Non-water soluble materials then float upon the surface of the water in the fluids, as the level of the fluid rises in the first chamber it is matched in the tube having communication with the first chamber. When the fluid level reaches the top of the tube the water fills the second chamber, being that the non-water soluble float they are retained in the first chamber while the water is allowed to flow into the second chamber. Each chamber has a chamber access port for such that the user may pump out each respective chamber and dispose of the contents.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A collection system for collecting liquid waste from a vehicle and separating non-water soluble contaminants from water in the liquid waste, the system comprising:

a support member having an upper surface and opposite first and second ends, said upper surface being for supporting the vehicle when the vehicle is positioned on the upper surface;

a ramp assembly extending from said first end of the support member for facilitating positioning the vehicle on the upper surface of the support member, said ramp assembly further being for elevating said first end of said support member relative to said second end of said support member;

a containment wall extending upwardly from said upper surface for collecting liquid waste falling from the vehicle when the vehicle is positioned on said upper surface of said support member;

a collection member having a hollow interior;

wherein said support member includes an aperture in said upper surface proximate said second end and a duct having a first end in environmental communication with said aperture whereby gravity urges said liquid waste collected through said aperture into said duct;

wherein said collection member includes a dividing wall separating said hollow interior into a first chamber and a second chamber, said duct having a second end in environmental communication with said first chamber, said first end of said duct being elevated relative to said second end of said duct whereby liquid waste collected passes through the duct and into the first chamber such that said liquid waste is collected in said first chamber;

wherein non-water soluble contaminants in said liquid waste having a lower density than water are positioned above an upper surface of water collected in said first chamber; and a tube having a lower end in communication with said first chamber through a hole in said dividing wall, said tube having an open upper end located at a higher vertical elevation than an upper edge of said hole in said dividing wall, said upper end of said tube being in environmental communication with said second chamber whereby non-water soluble contaminants positioned above said upper surface of water collected in said first chamber are retained in the first chamber as liquid is drawn through said tube into said second chamber when said upper surface of water collected in said first chamber is at a higher elevation than said upper edge of said hole in said dividing wall.

2. The collection system of claim 1, further comprising:
said containment wall being generally U-shaped, said containment wall having opposite sides, each side extending along an associated longitudinal side of said support member.

3. The collection system of claim 1, further comprising:
said first chamber having a first chamber pumping access port for facilitating pumping of liquid waste collected in said first chamber.

4. The collection system of claim 1, further comprising:
said second chamber having a second chamber pumping access port for facilitating pumping of water collected in said second chamber.

5. The collection system of claim 1, wherein said ramp assembly comprises:
a pair of ramp members, each ramp member extending outwardly from a respective side portion of said first end of said support member such that said ramp members are spaced to facilitate driving of the vehicle over said ramp members.

6. The collection system of claim 5, further comprising:
each of said ramp members having a planar upper surface, a planar bottom surface, said planar upper surface being substantially parallel to said planar bottom surface, each said ramp member further having a support surface extending from said bottom surface such that said support surface is adapted for abutting the ground.

7. The collection system of claim 1, further comprising:
said collection member being coupled to said second end of said support member.

8. The collection system of claim 1 wherein said tube has a cross-sectional area greater than a cross-sectional area of said duct.

9. A collection system for collecting liquid waste from a vehicle and separating non-water soluble contaminants from water in the liquid waste, the system comprising:
a support member having an upper surface and opposite first and second ends, said upper surface being for supporting the vehicle when the vehicle is positioned on the upper surface;

a ramp assembly extending from said first end of the support member for facilitating positioning the vehicle on the upper surface of the support member, said ramp assembly further being for elevating said first end of said support member relative to said second end of said support member;

a containment wall extending upwardly from said upper surface for collecting liquid waste falling from the vehicle when the vehicle is positioned on said upper surface of said support member;

a collection member having a hollow interior;

wherein said support member includes an aperture in said upper surface proximate said second end and a duct having a first end in environmental communication with said aperture whereby gravity urges said liquid waste collected through said aperture into said duct;

wherein said collection member includes a dividing wall separating said hollow interior into a first chamber and a second chamber, said duct having a second end in environmental communication with said first chamber, said first end of said duct being elevated relative to said second end of said duct whereby liquid waste collected passes through the duct and into the first chamber such that said liquid waste is collected in said first chamber;

wherein non-water soluble contaminants in said liquid waste having a lower density than water are positioned above an upper surface of water collected in said first chamber;

a tube having a lower end in communication with said first chamber through a hole in said dividing wall, said tube having an open upper end located at a higher vertical elevation than an upper edge of said hole in said dividing wall, said upper end of said tube being in environmental communication with said second chamber whereby non-water soluble contaminants positioned above said upper surface of water collected in said first chamber are retained in the first chamber as liquid is drawn through said tube into said second chamber when said upper surface of water collected in said first chamber is at a higher elevation than said upper edge of said hole in said dividing wall;

said containment wall being generally U-shaped, said containment wall having opposite sides, each side extending along an associated longitudinal side of said support member;

said first chamber having a first chamber pumping access port for facilitating pumping of liquid waste collected in said first chamber;

said second chamber having a second chamber pumping access port for facilitating pumping of water collected in said second chamber;

wherein said ramp assembly includes a pair of ramp members, each ramp member extending outwardly from a respective side portion of said first end of said support member such that said ramp members are spaced to facilitate driving of the vehicle over said ramp members;

each of said ramp members having a planar upper surface, a planar bottom surface, said planar upper surface being substantially parallel to said planar bottom surface, each said ramp member further having a support surface extending from said bottom surface such that said support surface is adapted for abutting the ground;

said collection member being coupled to said second end of said support member; and wherein said tube has a cross-sectional area greater than a cross-sectional area of said duct.

* * * * *